(12) United States Patent
Matsuo et al.

(10) Patent No.: US 8,051,985 B2
(45) Date of Patent: Nov. 8, 2011

(54) METHOD OF REMOVING UNBURNED CARBON FROM COAL ASH

(75) Inventors: Kazuyoshi Matsuo, Ichihara (JP); Kazuo Abe, Tokyo (JP); Takao Suzuki, Tokyo (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 177 days.

(21) Appl. No.: 12/448,139

(22) PCT Filed: Dec. 11, 2006

(86) PCT No.: PCT/JP2006/324645
§ 371 (c)(1),
(2), (4) Date: Jun. 10, 2009

(87) PCT Pub. No.: WO2008/072299
PCT Pub. Date: Jun. 19, 2008

(65) Prior Publication Data
US 2009/0301938 A1 Dec. 10, 2009

(51) Int. Cl.
*B03B 7/00* (2006.01)
(52) U.S. Cl. ............... 209/12.1; 209/2; 209/10; 209/19
(58) Field of Classification Search ............ 209/2, 10, 209/12.1, 19
See application file for complete search history.

(56) References Cited

U.S. PATENT DOCUMENTS

| | | | | |
|---|---|---|---|---|
| 4,424,065 A * | 1/1984 | Langhoff et al. | ........... | 48/197 R |
| 4,426,282 A * | 1/1984 | Aunsholt | ............ | 209/167 |
| 4,474,619 A * | 10/1984 | Meyer et al. | ........ | 209/166 |
| 4,526,680 A * | 7/1985 | Owen | ........... | 209/166 |
| 4,532,032 A * | 7/1985 | Ng et al. | ........ | 209/166 |
| 4,593,859 A * | 6/1986 | Nakaoji et al. | .......... | 241/20 |
| 4,676,804 A * | 6/1987 | Miller et al. | ........ | 44/627 |
| 4,712,742 A * | 12/1987 | Ogawa et al. | ........ | 241/20 |
| 4,737,272 A * | 4/1988 | Szatkowski et al. | ......... | 209/164 |
| 4,925,559 A * | 5/1990 | Biermann et al. | ......... | 209/166 |
| 5,022,983 A * | 6/1991 | Myers et al. | ........ | 209/167 |
| 5,379,902 A * | 1/1995 | Wen et al. | ........... | 209/166 |
| 6,793,079 B2* | 9/2004 | Khan et al. | ............ | 209/168 |
| 7,163,105 B2* | 1/2007 | Jameson et al. | ........... | 209/164 |
| 7,328,806 B2* | 2/2008 | Khan et al. | .......... | 209/168 |
| 2003/0106843 A1* | 6/2003 | Jameson et al. | ........ | 209/162 |
| 2004/0099575 A1* | 5/2004 | Khan et al. | ............ | 209/164 |
| 2004/0256294 A1* | 12/2004 | Khan et al. | ............ | 209/166 |
| 2005/0051465 A1* | 3/2005 | Khan et al. | ............ | 209/162 |
| 2005/0121370 A1* | 6/2005 | Jameson et al. | ............ | 209/164 |
| 2007/0199486 A1 | 8/2007 | Saito et al. | ........... | 110/344 |

FOREIGN PATENT DOCUMENTS

JP 3613347 1/2005

* cited by examiner

*Primary Examiner* — Terrell Matthews
(74) *Attorney, Agent, or Firm* — Kubovcik & Kubovcik

(57) ABSTRACT

A method comprising; a step in which unburned carbon contained in coal ash is mechanically separated with a classifier; a step in which the coal ash from which part of the unburned carbon has been removed with the classifier is pulverized or disaggregated with a pulverizer; a step in which water is added to the coal ash pulverized or disaggregated with the pulverizer to obtain a slurry; a step in which a scavenger is added to the slurried coal ash; a step in which a shear force is applied to the slurry containing the scavenger to cause the scavenger to selectively adhere to the unburned carbon contained in the coal ash; a step in which a foaming agent is added to the slurry in which the scavenger has adhered to the unburned carbon; and a step in which the unburned carbon is floated on the slurry containing the foaming agent together with bubbles and is separated.

3 Claims, 6 Drawing Sheets

METHOD OF REMOVING UNBURNED CARBON FROM COAL ASH

FIELD OF THE INVENTION

The present invention relates to a method of removing unburned carbon from coal ash, and in particular to a method of more efficiently removing unburned carbon from coal ash which is generated in a coal fired power plant or a fluidized bed combustion furnace.

DESCRIPTION OF THE RELATED ART

The coal ash which occurs in coal fired power plants and fluidized bed combustion furnaces, etc. (referred as fly ash hereinafter), has been used as a raw material for cement and artificial lightweight aggregate or as a cement admixture. However, if fly ash is used as a cement admixture, unburned carbon included in the fly ash can absorb AE agent or water-reducing agent etc., causing a problem which adversely affects the kneading work of concrete.

Because of the water repellency of unburned carbon, when concreting, the harmful effects of the unburned carbon floating up to the surface of the concrete, or black parts in the concrete-jointed areas caused by the unburned carbon can occur. Moreover, with a high content of unburned carbon in fly ash, the problem of the quality of the artificial lightweight aggregate being lowered can occur. Therefore, only good quality fly ash containing a small amount of unburned carbon has been used as a cement admixture, while fly ash containing a large amount of unburned carbon has been used as raw material for cement processed in rotary kilns or as industrial waste used in reclamation.

In order to solve the above problems, the specification of Japanese patent No. 3613347, for example, proposes a method comprised of the following steps: slurrying by adding water to fly ash, adding a collector such as kerosene to the obtained fly ash slurry, causing the unburned carbon to stick to the collector by applying surface-upgrading to the fly ash through a high-speed shearing mixer to improve the flotation ability of the unburned carbon, and then separating the unburned carbon through flotation.

The method is relatively easy regarding the separation of the unburned carbon where fly ash a is melted and re-solidified into an approximately spherical shape through high-temperature combustion (for example, 1200 to 1500 degrees) and unburned carbon b is separated as a unit of body (refer to FIG. 4). That is, any unburned carbon of some wt % to some 10 wt % included in raw fly ash can be separated and removed down to 1 wt % or lower. However, depending on the generating conditions such as combustion temperature, burning method, coal type or coal composition, the ash content a' and an unburned carbon content b' often exist as a partially incorporated mass. In this case, the separation rate of the unburned carbon will decrease (refer to FIG. 5).

Furthermore, compared to the fly ash from a pulverized coal combustion furnace, the fly ash from a fluidized bed combustion furnace is recovered as unmelted ash in low temperature combustion (for example, 850 degrees), and ash content a' and unburned carbon content b' are combined, similar to a dumpling, as shown in FIG. 6. Consequently, the separation rate of the unburned carbon is considerably lowered and the flotation method using surface-upgrading cannot be applied thereto. In FIG. 4 to FIG. 6, the symbol M denotes the raw material, the symbol H the tail, and the symbol I froth.

DISCLOSURE OF THE INVENTION

Problem to be Solved by the Invention

The present invention is developed to resolve these problems, and its objective is to provide a method for removing unburned carbon from coal ash by efficiently separating an ash content in fly ash through applying the flotation method using surface-upgrading to the fly ash, in the case when removing the unburned carbon included in the fly ash.

Means for Solving the Problem

To resolve the above problems, the present invention is constituted as follows.

In the invention according to a first embodiment, the method for removing unburned carbon from coal ash comprises the steps of; mechanically separating the unburned carbon from the coal ash using a classifying unit; grinding or crushing the coal ash by means of a grinding unit in which the unburned carbon is partially removed by the classifying unit; slurrying by adding water to the coal ash grinded or crushed by the grinding unit; adding a collector to the slurried coal ash; selectively making the collector attach to the unburned carbon in the coal ash by applying shearing force to the slurry to which the collector is added; adding a frother to the slurry after having made the collector attach to the unburned carbon; and separating the foam and the unburned carbon from the slurry after having added the frother thereto through flotation thereof.

In the invention according to a second embodiment, in the method for removing the unburned carbon in the coal ash according to the first embodiment, in classifying of the unburned carbon in the coal ash, a dry type or a wet type classifying unit is applied thereto, and the mesh size of the classifying unit is set to 20 to 200 μm.

In the invention according to a third embodiment, in the method for removing the unburned carbon in the coal ash according to the first embodiment, in grinding or crushing of the fly ash including the unburned carbon, a dry type hammer mill or a roller mill is applied thereto.

EFFECT OF THE INVENTION

In the present invention, by mechanically separating in advance the unburned carbon in the coal ash using a classifying unit, the unburned carbon in the coal ash is partially removed and the purity of the ash content in the coal ash becomes somewhat higher. Thereafter, the ash content and the unburned carbon content are separated as unit. Then the separation performance of the ash content and the unburned carbon content is further improved, and this is carried out by grinding or crushing the coal ash from which the unburned carbon is partially removed by means of the classifying unit. Accordingly, the flotation method using surface-upgrading can be applied to not only fly ash from a conventional pulverized coal combustion furnace but also to fly ash from a fluidized bed combustion furnace.

Furthermore, by applying shearing force to the coal ash slurry which contains the unburned carbon to which a collector has been added before the flotation step, the dispersal effect of the unburned carbon, the ash content, or the collector in the slurry is not only improved upon, but activation energy (surface energy) is also transitionally generated on the surfaces of the dispersed particles. In this process of the transitional subsidence of the surface energy, the surfaces of hydrophobic unburned carbon particles and that of the collector particles are close to each other, and the surface energy of both will be lowered. Also, the surfaces of the hydrophobic dispersed particles adapt better to water, hence these particles can disperse into water, and all of the surface energy will be lowered.

As a result of the above, unburned carbon particles to which the collector is attached through surface-upgrading have their lipophilicity stably increased and the performance of the flotation in the after flotation step of the flotation tailing, which is then, efficiently separated by the ash content dispersing into water. For coal ash slurry, the unburned carbon can be efficiently removed in general. Also the amount of a collector must be about 0.5 to 2.0 wt % in cases where pre-processing is not carried out in the conventional manner. But in the present invention, by classifying or crushing the coal ash as a raw material beforehand, the amount of collector required is only about 0.05 to 1.0 wt % for coal ash.

Thereby, since the collector can be saved and the residual amount of kerosene, etc., in fly ash as a product is also small, the processing after the flotation step becomes simpler. Furthermore, in the fly ash from fluidized bed combustion, which originally was insufficient for separating the ash content and the unburned content, the flotation method after surface-upgrading can attain a higher-degree of unburned carbon removal.

BEST MODES FOR CARRYING OUT THE INVENTION

Figure 1:
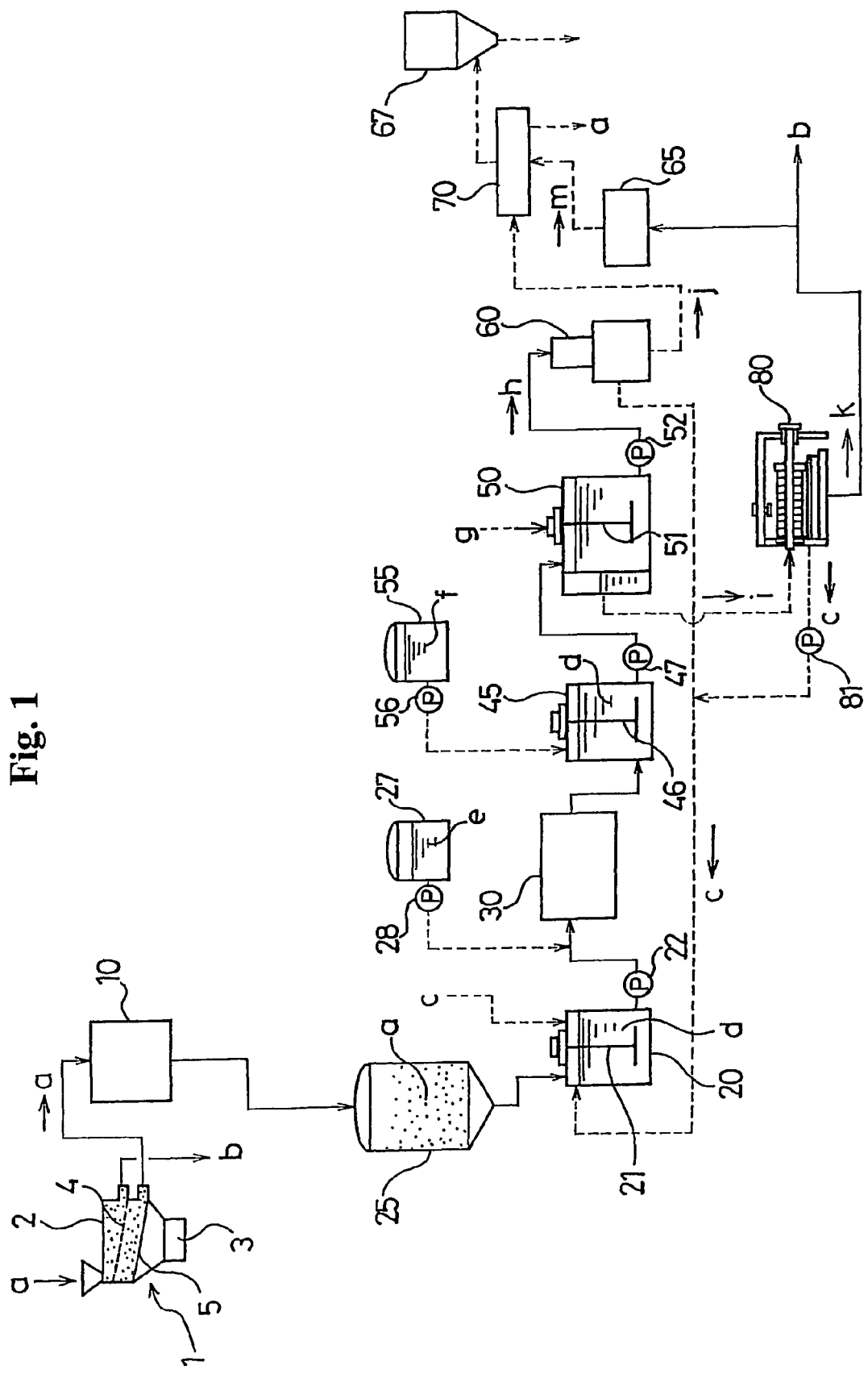
FIG. 1 shows a schematic constitution view of a facility for carrying out a method of removing unburned carbon in coal ash according to the present invention.

The mode of carrying out the present invention will be described by referring to the drawings in the following.

As shown in FIG. 1, a facility for carrying out a method of removing unburned carbon in coal ash according to the present invention primarily comprises; a classifying unit 1 for removing unburned carbon in the coal ash (referred as fly ash hereinafter) of raw material, a grinding unit 10 for grinding or crushing the fly ash in which unburned carbon is partially removed through the classifying unit 1, a slurry tank 20 for slurrying the fly ash grinded by means of the grinding unit 10 by adding water thereto, a high speed shearing mixer 30 for upgrading the surface of unburned carbon by applying shearing force to the slurry and a collector after adding a collector to the slurry, an adjusting reservoir 45 for adding a frother to the slurry of which the surface is upgraded, a flotation unit 50 for floating the unburned carbon by attaching the unburned carbon in the fly ash thereto to foam, a solid-liquid separator 60 for solid-liquid separating tailing from the flotation unit 50, a dryer 70 for producing dried fly ash (products) by drying cake from the solid-liquid separator 60, and a filter press 80 for obtaining unburned carbon by solid-liquid separating froth from the flotation unit 50.

The classifying unit 1 is used for removing the unburned carbon from the fly ash a and is constituted to vibrate a screen body 2 having a shape like a closed vessel by means of a vibrator 3. The screen body 2 is provided with a screen 4 for classification therein and a reception plate 5 for receiving fly ash a separated from unburned carbon below. This classifying unit 1 is usually used in a dry manner, but may be used in a wet manner by request. In the wet manner, it needs to be properly filled with water.

A range of 20 to 200 μm is used as a mesh size for the screen 4, but a range of 40 to 100 μm is preferred. In cases where the mesh size of the screen 4 is more than 200 μm, removal of the unburned carbon is difficult if the particle diameter of the unburned carbon is about 5 to 200 μm. On the other hand, in the case where the mesh size of the screen 4 is less than 20 μm, the particle diameter is approximately 5 to 100 μm. Hence the fly ash is likely to be mixed into the unburned carbon side in a large quantity. The average particle diameter of the unburned carbon is approximately 20 to 100 μm in general and is larger than the average particle diameter of fly ash at about 20 μm, hence classifying the unburned carbon having a large average particle diameter in advance is effective.

Figure 2:
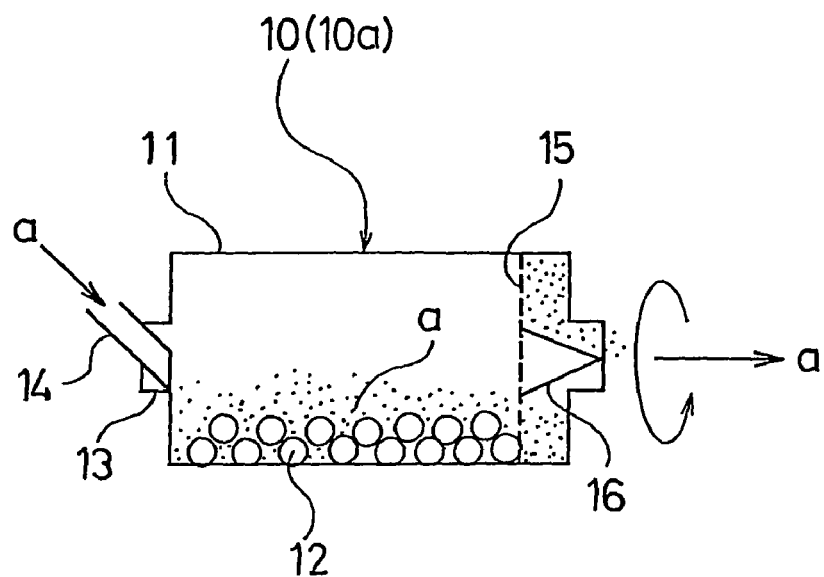
FIG. 2 shows a cross sectional view of a grinding unit.

The grinding unit 10 is for grinding or crushing (crushing unburned carbon and ash content and separating as a unit) fly ash a (for example, fly ash in a pulverized coal combustion furnace or fly ash in a fluidized bed combustion furnace) in which unburned carbon is partially removed by the classifying unit 1. A dry type ball mill, a wet type ball mill, a dry type hammer mill or a roller mill may be preferably used. The dry type ball mill 10a is filled with a number of steel balls 12 in a lateral rotating drum 11 as shown in FIG. 2. It is provided with a duct 14 for supplying raw material into an inlet 13 thereof, and is provided with a porous plate 15 for preventing the steel ball from flowing out of the outlet side thereof. The numeral 16 denotes a cone guide for guiding the smashed fly ash a.

A slurry tank 20 is provided for producing slurry d using fly ash a and water c, and it has a stirring blade 21 for stirring the slurry d therein. The slurry tank 20 is provided with a fly ash tank 25 and a water supply unit (not shown) in the pre-stage thereof, and a pump 22 for supplying the slurry d to a high speed shearing mixer 30 in the after-stage thereof.

Figure 3:
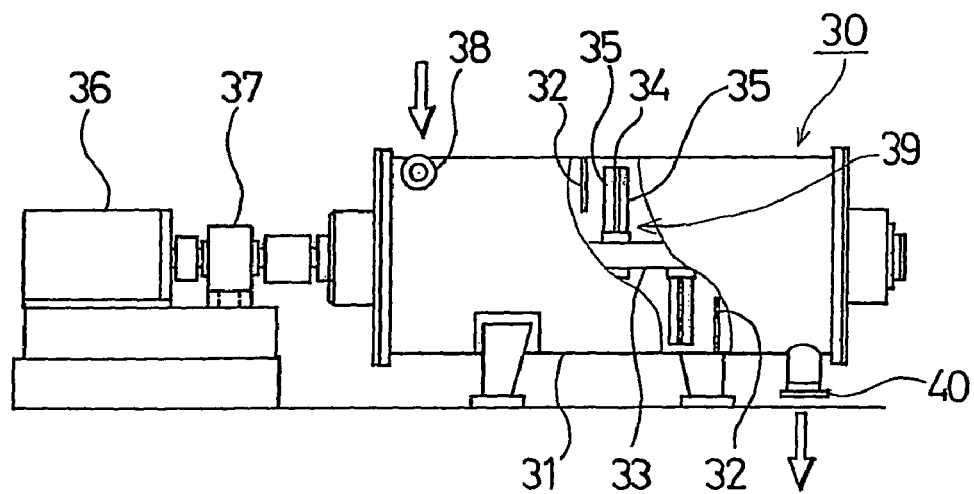
FIG. 3 shows a side view which includes a partial sectional view of a high speed shearing mixer.
Figure 4:
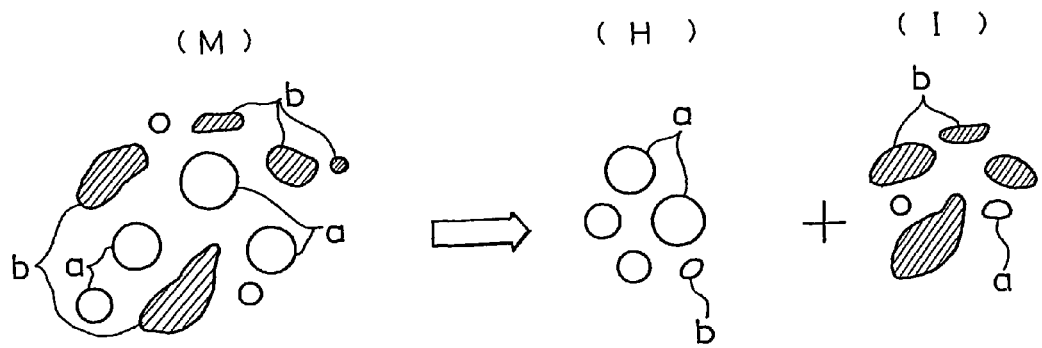
FIG. 4 shows a flotation manner by surface-upgrading of fly ash separated as unit.
Figure 5:
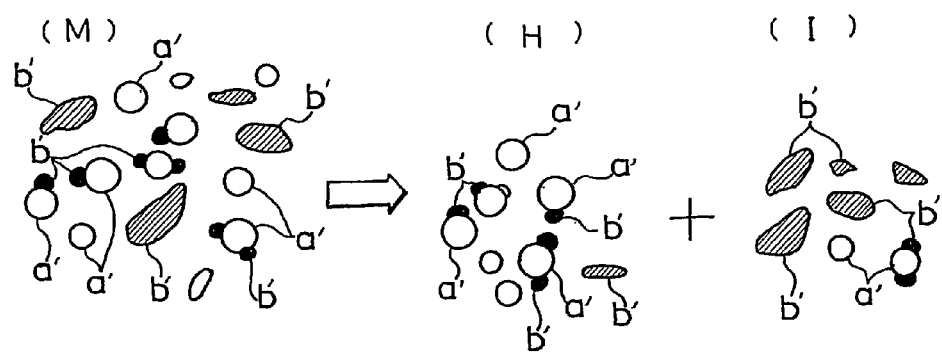
FIG. 5 shows a view for illustrating a flotation manner by surface-upgrading of fly ash in which ash content and unburned carbon content is partially united with each other.
Figure 6:
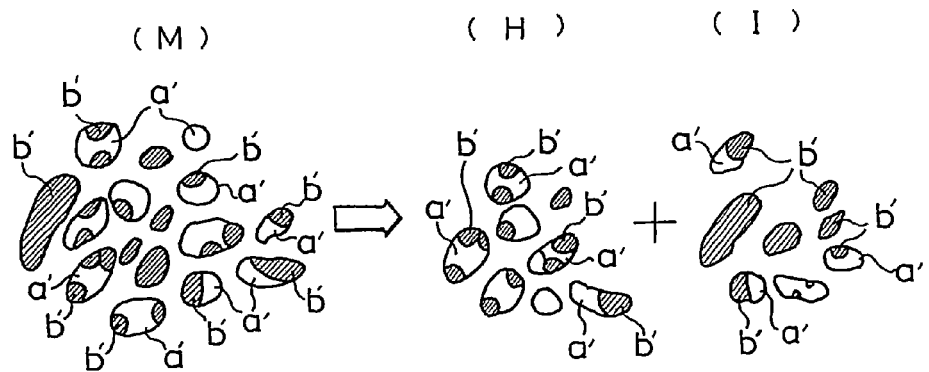
FIG. 6 shows a view for illustrating a flotation method by surface upgrading of fly ash in a fluidized bed combustion furnace.

The high speed shearing mixer 30 is provided for upgrading the surface of the unburned carbon by applying shearing force to the slurry and the collector. The high speed shearing mixer 30, as shown in FIG. 3, is provided with a lateral cylindrical body 31, a plurality of annular partition walls 32 for axially dividing the body 31 into a plurality of chambers, and a plurality of stirring blades 35 radially fixed on both sides of a disk 34 provided on a rotary shaft 33 penetrating through the body 31. It is constituted to rotate the rotary shaft 33, the disk 34, and the stirring blade 35 by means of a motor 36 and a reduction gear 37. There are, in the pre-stage of the high speed shearing mixer 30, a kerosene tank 27 for reserving kerosene as a collector and a pump 28 for supplying kerosene e to the inlet of the high speed shearing mixer 30 as shown in FIG. 1.

In an adjusting reservoir 45, a frother f supplied from a frother tank 55 via a pump 56 is added to the slurry introduced from the high shearing mixer 30. These are mixed at low speed, and the adjusting reservoir 45 is provided with stirring blades 46 therein. In the after-stage of the adjusting reservoir 45, a pump 47 is disposed for supplying the slurry d to a flotation unit 50.

The flotation unit 50 makes the unburned carbon in the fly ash attach to the foam to float on and is for separating the unburned carbon (froth) and the fly ash (tail), and, for example, is a unit that has a stirring blade 51 therein. Also there is a case where an air supply unit (not shown) for supplying air g to generate foam is provided above the flotation unit 50, or a case of self-suction type by stirring. A pump 52 is disposed for supplying tailing h to a solid-liquid separation unit 60 in the after-stage of the flotation unit 50.

The solid-liquid separation unit 60 is provided for solid-liquid separating the tailing h which includes the fly ash fed from the flotation unit 50, and for separating the tailing h into the cake j and the water c. Here, a centrifugal extractor or the like is used as a solid-liquid separator. A dryer 70 is provided for drying the cake j supplied from the solid-liquid separator 60 using hot air m fed from a hot air furnace 65 where the moisture value of the solid-liquid separated cake j is higher than a target value. The dried cake j, that is, the fly ash a (products) is used as an admixture for cement.

A bag filter 67 is provided for recovering pulverized powder from the dryer 70, and the recovered pulverized powder is also used as an admixture for cement etc. A filter press 80 is provided for solid-liquid separating the froth i including the unburned carbon fed from the flotation unit 50. Also, the water c discharged from the filter press 80 is reused for the slurry tank 20 etc. via a pump 81. The hot air furnace 65 is provided for generating hot air m by using the unburned carbon discharged from the filter press 80 as fuel, and the obtained hot air is used in the dryer 70.

Next, the operation procedure of the above facility is described by referring to FIGS. 1 to 3.

As shown in FIG. 1, the fly ash a of raw material thrown into the classifying unit 1 is classified into the fly ash a and the unburned carbon b by the vibration of the screen 4. Since the unburned carbon is attached to the surface of the classified fly ash a, or the fly ash and the unburned carbon are united with each other, they are supplied to the grinding unit 10 and are smashed or crushed. On the other hand, the unburned carbon b is effectively used as fuel.

Figure 7:
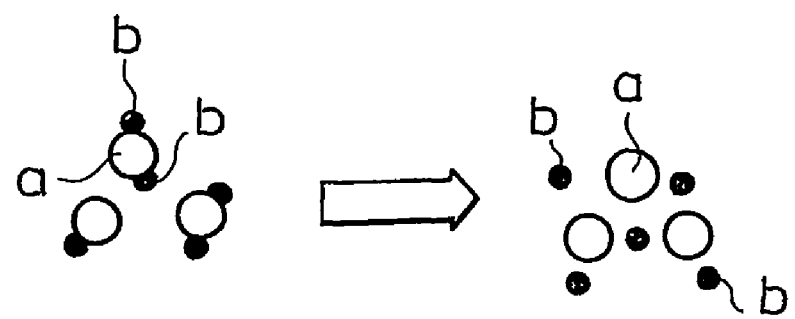
FIG. 7 shows a view for illustrating the crushing situation of ball-like fly ash to which unburned carbon is attached.
Figure 8:
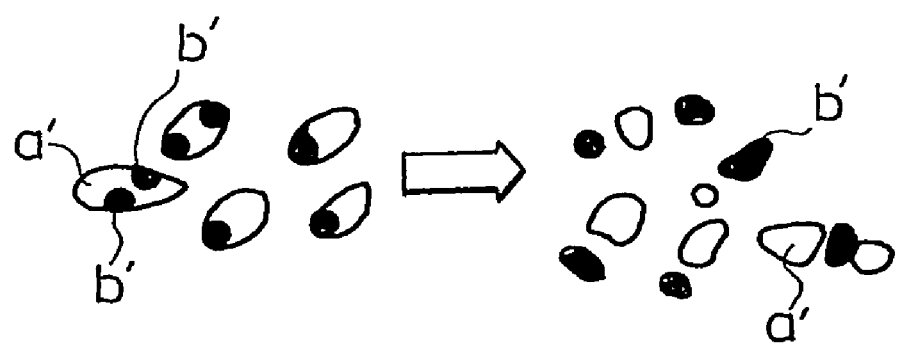
FIG. 8 shows a view for illustrating the grinding situation of an unburned carbon content and an ash content united with each other.

The fly ash a supplied to the grinding unit 10, for example, the dry ball mill 10a (referring to FIG. 2) is smashed or crushed. It is crushed as shown in FIG. 7 if the unburned carbon b is attached to the ball-like fly ash a. On the other hand, in the case where the ash content a' and the unburned carbon content b' are united with each other, the united ash content a' and unburned carbon b' is smashed and separated as shown in FIG. 8. The fly ash a which includes the unburned carbon grinded or crushed by the smash unit 10 is reserved in the fly ash tank 25.

The fly ash a reserved in the fly ash tank 25 is supplied to the slurry tank 20 and becomes the fly ash slurry d (referred as slurry d hereinafter) by mixing with the water d. Here, the fly ash concentration in the slurry is adjusted within a range of 10 to 40 wt %. The slurry d in the slurry tank 20 is supplied to the high speed shearing mixer 30 by the pump 22. The kerosene e as a collector coming via the pump 28 from the kerosene tank 27 is supplied to the inlet of the high speed shearing mixer 30. A general collector such as light oil or heavy oil other than kerosene may be used. The additional amount of the collector is adjusted in a range of 0.05 to 1.0 wt % for fly ash.

Next, the shearing force is applied to this slurry and the collector. The shearing force can be applied by using the high speed shearing mixer 30 shown in FIG. 3. The shearing force is applied to the slurry and the collector supplied from the inlet 38 of the high speed shearing mixer 30 by the stirring blade 35 rotating at high speed within each chamber 39 partitioned by the partition wall 32. At that time, the short passing of the slurry d is checked by the annular partition wall 32, and the shearing force can be applied to the slurry and the collector. The surface-upgraded slurry to which the shearing force is applied is discharged from the exit 40 and supplied to the adjusting reservoir 45.

As shown above, the objective of applying the shearing force to the fly ash slurry and the collector is to improve the float property of the flotation by upgrading the surface of unburned carbon. This point is described by referring to FIGS. 9(a) to 9(c) in the following.

Figure 9:
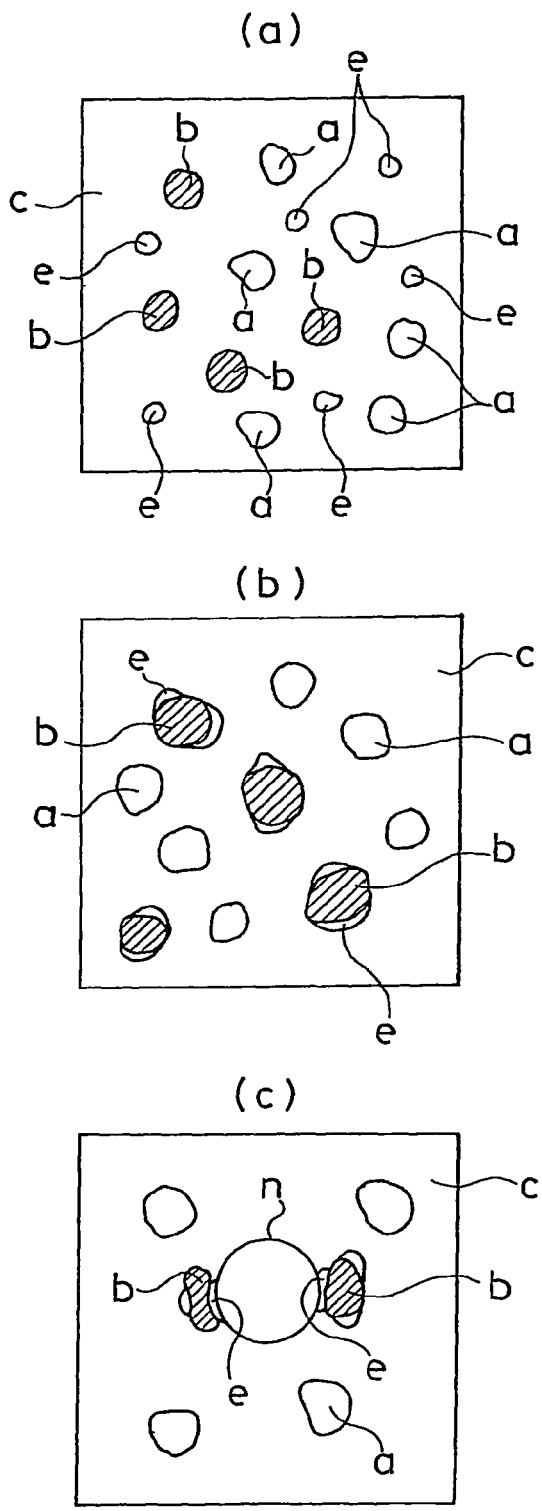
FIG. 9(a) shows a schema in the addition of a collector.
FIG. 9(b) shows a schema in surface upgrading.
FIG. 9(c) shows a schema in flotation.

In a mere mixture of the collector to slurry which includes fly ash as shown in FIG. 9(a), the condition that the fly ash a, the unburned carbon b and the collector e are separately mixed into the water c is only realized. Granted that the slurry is supplied to the flotation unit in such a condition, but the amount of unburned carbon which is attached to the foam together with the collector is minimal. The unburned carbon in the fly ash cannot be effectively removed by flotation in the selection method.

If the surface upgrading is given by applying the shearing force to the slurry and the collector shown in FIG. 9(a), the collector e is attached to the surface of the unburned carbon b, as shown in FIG. 9(b). Moreover, in flotation by using the selection unit, the unburned carbon b to which the collector e is attached floats on by attaching to the foam n as shown in FIG. 9(c). Thus, the floating property of the flotation can be improved. When the shearing force is applied to the slurry and the collector by means of the high speed shearing mixer 30, the stirring force of 10 to 100 kWh/m$^3$ per unit slurry amount of the slurry, but preferably 30 to 50 kWh/m$^3$, is applied to the slurry.

Next, the froth i which includes unburned carbon discharged from the flotation unit 50 is solid-liquid-separated by means of the filter press 80, and the unburned carbon b is recovered as shown in FIG. 1. The moisture dehydrated in the filter press 80 is supplied to the slurry tank 20 by the pump 81, and in addition is reused for adding to new fly ash or foam-quenching when the unburned carbon is made to attach to the foam in the flotation unit 50.

The tailing h including the fly ash from the flotation unit 50 is solid-liquid-separated by the solid-liquid-separator 60. When the moisture of the cake j is higher than a target value, the unburned carbon b discharged from the filter press 80 is burned in the hot air furnace 65, and the cake j is dried by the hot air m obtained at this time from the dryer 70. The dry fly ash (products) in which the unburned carbon content is not more than 1 wt % can be used as a mixture for cement etc. Also, particles recovered by the bag filter 67 can be used as a mixture for cement, etc.

Here, as a means for applying the shearing force to the slurry and the collector, for example, an eductor etc. as well as the high speed shearing mixer can be utilized. In fact, the surface of unburned carbon may be upgraded to attach the collector such as kerosene to the unburned carbon.

EMBODIMENT

Embodiment 1

Fly ash (unburned carbon content 5.0 wt %) is classified into 60 μm and under by means of a dry type classifying unit that vibrates, and the fly ash (unburned carbon content 3.5 wt %) including the classified unburned carbon is grinded by a dry type ball-mill (rotary speed: 60 rpm) for 5 minutes.

Next, water 1000 ml and fly ash 200 g (unburned carbon content 3.5 wt %) after being grinded are made into slurry by mixing while stirring it. Kerosene (a collector) is added to this slurry in the range of 0.1 to 2.5 ml, shearing force is applied to the slurry and the kerosene by stirring in the high speed shearing mixer shown in FIG. 3 at high speed (873 rpm), and the unburned carbon in the fly ash is surface-upgraded by hydrophobization.

After the upgrading step, the slurry is supplied to the flotation unit, 0.2 g of MIBC is added as the frother, and the unburned carbon is attached to the generated foam by the flotation operation to float on. The floated froth is taken out as an unnecessary content. These steps are carried out for 5 minutes. From the additional amount of this kerosene and the relation between the unburned carbon content in the fly ash (products: tail) that remains in the flotation reservoir and the recovery amount of the fly ash (products), it is found that the unburned carbon content in the fly ash (products) with the oil addition rate of about 0.5 wt % to the fly ash is not more than 0.5%.

Figure 10:
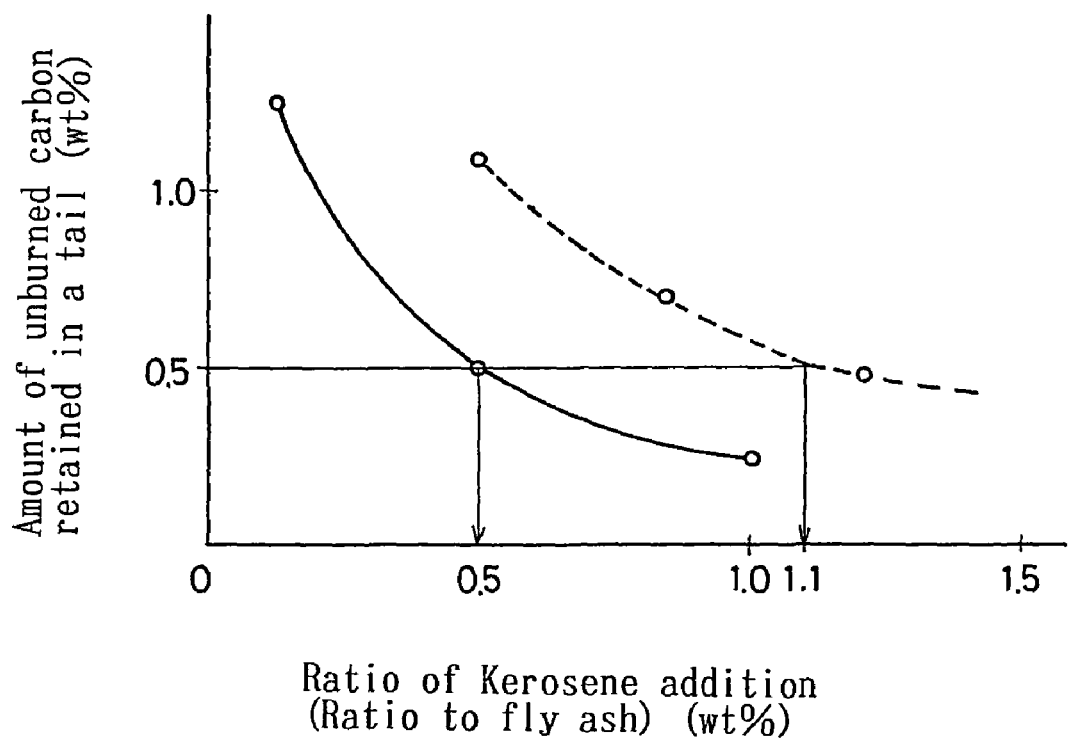
FIG. 10 shows the relation of the rate of kerosene addition and an unburned carbon amount retained in a tail.

But if there is no pre-processing, that is, in the case where the fly ash including the classified unburned carbon was not grinded by the dry type ball after classifying the fly ash by the dry type classifying unit, the oil addition rate of kerosene requested is approximately 1.1 wt % for the fly ash (refer to FIG. 10). In FIG. 10, the solid line shows the case of the present invention and the broken line shows the case of no pre-processing.

INDUSTRIAL APPLICABILITY

The present invention can be applied to a method of effectively removing unburned carbon from fly ash generated in a coal burning thermal power plant or a fluidized combustion furnace.

What is claimed is:

1. A method of removing unburned carbon from coal ash, comprising the steps of; mechanically separating the unburned carbon from the coal ash using a dry type classifying unit; grinding or crushing the coal ash from which the unburned carbon has been partially removed by the dry type classifying unit by means of a dry type grinding unit; slurrying by adding water to the coal ash grinded or crushed by the dry type grinding unit; adding a collector to the slurried coal ash; selectively making the collector attach to the unburned carbon in the coal ash by applying shearing force to the slurry to which the collector is added; adding a frother to the slurry after having made the collector attach to the unburned carbon; and separating the foam and the unburned carbon from the slurry after having added the frother thereto through flotation thereof.

2. The method for removing unburned carbon in coal ash according to claim 1, wherein in the classifying of the unburned carbon in the coal ash, a dry type classifying unit is applied thereto, and the mesh size of the classifying unit is set at 20 to 200 μm.

3. The method for removing unburned carbon in coal ash according to claim 1, wherein in the grinding or crushing of the fly ash including the unburned carbon, a dry type hammer mill or a roller mill is applied thereto.

* * * * *